(12) United States Patent
Bandyopadhyay et al.

(10) Patent No.: US 10,883,182 B2
(45) Date of Patent: Jan. 5, 2021

(54) MICROFLUIDIC ELECTROLYZER FOR CONTINUOUS PRODUCTION AND SEPARATION OF HYDROGEN/OXYGEN

(71) Applicant: INDIAN INSTITUTE OF TECHNOLOGY, GUWAHATI, Guwahati (IN)

(72) Inventors: Dipankar Bandyopadhyay, Guwahati (IN); Tapas K Mandal, Guwahati (IN); Saptak Rarotra, Guwahati (IN)

(73) Assignee: INDIAN INSTITUTE OF TECHNOLOGY, GUWAHATI, Guwahati (IN)

( * ) Notice: Subject to any disclaimer, the term of this patent is extended or adjusted under 35 U.S.C. 154(b) by 302 days.

(21) Appl. No.: 15/773,365

(22) PCT Filed: Jan. 16, 2017

(86) PCT No.: PCT/IN2017/050022
§ 371 (c)(1),
(2) Date: May 3, 2018

(87) PCT Pub. No.: WO2017/175237
PCT Pub. Date: Oct. 12, 2017

(65) Prior Publication Data
US 2018/0327916 A1      Nov. 15, 2018

(30) Foreign Application Priority Data
Apr. 8, 2016    (IN) .............................. 201631012510

(51) Int. Cl.
*C25B 9/06* (2006.01)
*C25B 9/00* (2006.01)
*C25B 1/04* (2006.01)

(52) U.S. Cl.
CPC .................. *C25B 9/06* (2013.01); *C25B 1/04* (2013.01); *C25B 9/00* (2013.01); *Y02E 60/36* (2013.01); *Y02P 20/133* (2015.11)

(58) Field of Classification Search
None
See application file for complete search history.

(56) References Cited

U.S. PATENT DOCUMENTS 4,265,721 A    5/1981   Hackmyer
4,367,131 A    1/1983   Gratzel et al.
(Continued)

FOREIGN PATENT DOCUMENTS

WO    WO 2016/063206 A1 *    4/2016    ............. C25B 15/08

OTHER PUBLICATIONS

Studer et al, Frabrication of microfluidic devices for AC electrokinetic fluid pumping, Microelectronic Engineering, vol. 61-62, Jul. 2002, pp. 915-920 (Year: 2002).*

(Continued)

*Primary Examiner* — Harry D Wilkins, III
(74) *Attorney, Agent, or Firm* — The PL Law Group, PLLC

(57) ABSTRACT

A microfluidic electrolyzer includes a housing having a power source, a sea water reservoir, a downstream microfluidic reactor connected to the reservoir and a collector for storing the separated gases emanating from the microfluidic reactor. The downstream microfluidic reactor includes a substrate, a microchannel embedded with respect to the substrate and providing a water inlet end at one end and a product outlet at the other, and a pair of electrodes. The electrodes are electrically connected with the power source and each electrode has an operative end inserted within the microchannel constituting an anode and a cathode. The cathode and the anode are positioned one ahead of the other, (Continued)

from the water inlet end and maintained in direct contact with the water to generate the oxygen and hydrogen involving electrolysis of the water and in-situ separate pathways of the hydrogen and oxygen free of any mixing with each other.

13 Claims, 12 Drawing Sheets

(56) References Cited

U.S. PATENT DOCUMENTS

| | | | | |
|---|---|---|---|---|
| 4,411,764 | A * | 10/1983 | Harman, III | G01N 27/4166 |
| | | | | 204/411 |
| 4,457,813 | A * | 7/1984 | Rogers | C25B 3/00 |
| | | | | 205/415 |
| 4,650,554 | A | 3/1987 | Gordon | |
| 4,726,888 | A | 2/1988 | McCambridge | |
| 4,761,208 | A * | 8/1988 | Gram | C02F 1/46104 |
| | | | | 204/237 |
| 5,037,518 | A * | 8/1991 | Young | C25B 1/10 |
| | | | | 204/228.5 |
| 5,534,120 | A * | 7/1996 | Ando | C02F 1/4618 |
| | | | | 204/269 |
| 5,556,523 | A * | 9/1996 | Satoh | C02F 1/46104 |
| | | | | 204/272 |
| 7,338,590 | B1 | 3/2008 | Shelnutt et al. | |
| 8,444,847 | B1 | 5/2013 | Evans et al. | |
| 2006/0003217 | A1 * | 1/2006 | Cohen | H01M 8/006 |
| | | | | 429/428 |
| 2007/0284249 | A1 * | 12/2007 | Ohta | B01L 13/02 |
| | | | | 204/451 |
| 2009/0139856 | A1 | 6/2009 | Chiarini, Jr. | |
| 2009/0260692 | A1 * | 10/2009 | Walavalkar | B01L 3/50273 |
| | | | | 137/13 |
| 2010/0230272 | A1 | 9/2010 | Gonzalez et al. | |
| 2012/0097550 | A1 | 4/2012 | Lockhart | |
| 2012/0145532 | A1 | 6/2012 | Smolyakov et al. | |
| 2012/0149789 | A1 | 6/2012 | Greenbaum | |
| 2013/0248349 | A1 | 9/2013 | Mul et al. | |
| 2017/0217799 | A1 * | 8/2017 | Hanaoka | C02F 1/283 |
| 2017/0314146 | A1 * | 11/2017 | Hosseini Hashemi | C25B 1/06 |

OTHER PUBLICATIONS

Davis et al, Electrolysis of Water in the Secondary School Science Laboratory with Inexpensive Microfluidics, Journal of Chemical Education, vol. 92, No. 1, Oct. 2014, pp. 116-119 (Year: 2014).*
International Search Report for PCT/IN2017/050022.
Muhammed Enes Oruc, "Energy Analysis and Fabrication of Photovoltaic Thermal Water Electrolyzer and Ion Transport Through Modified Nanoporous Membranes", University of Illinois at Urbana-Champaign, 2014, 143 pages; p. 5, 6 and 7, Figure 1.3a, 1.3b; chapter 33.2 at p. 39-40; Figure 3.2 (e-f).
"Microfluidic Electrolyzer: Testing Artificial Photosynthesis", Published on Science, vol. 2.0, Oct. 2013 <URL: http://www.science20.com/news_articles/micr ofluidic_electrolyzer_testing_artificial_ photosynt hesis-114417>.

* cited by examiner

MICROFLUIDIC ELECTROLYZER FOR CONTINUOUS PRODUCTION AND SEPARATION OF HYDROGEN/OXYGEN

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/IN2017/050022, filed Jan. 16, 2017, which claims priority to the benefit of India Patent Application No. 201631012510 filed in the India Intellectual Property Office on Apr. 8, 2016, the entire contents of which are incorporated herein by reference.

FIELD OF THE INVENTION

The present invention is related to the design and development of an energetically self-reliant microfluidic electrolyzer for continuous production and in situ separation of products hydrogen and/or oxygen from naturally abundant resources such as sea water and solar energy. The microfluidic electrolyzer of the present advancement is envisioned to be installed in the vast sea shore areas across the globe to produce abundance of hydrogen from solar energy and sea water in order to meet the energy demands of the modern society. The present microfluidic electrolyzer could continuously produce clean fuel hydrogen gas with the help of electric field obtained through the solar cell under direct solar illumination when sea water was flown continuously inside the microfluidic electrolyzer. The proposed microfluidic electrolyzer is also targeted to address cost-effectiveness issues related the conventional macroscopic electrolysis processes, which face hindrances in large scale commercialization owing to the use of costly electrical energy generated from the fossil fuels.

BACKGROUND ART

Portability, energy efficiency, sustainability, and eco-friendliness are among the top priorities of all contemporary technologies. Thus, it is not surprising that the photovoltaic and electrochemical cells are poised to replenish the energy requirements supported by the fossil fuels. The applications based on fossil fuels are also on the verge of phasing out because of speedy depletion of the natural reserves. Certainly, in recent times, hydrogen ($H_2$) based fuel cells have shown their remarkable capacity to energize the display panels, mobiles, personal computers, tablets, and automobiles, among others. At this stage, the major challenges are to produce plentiful $H_2$ employing the 'green' processes matching the demand of the society and also to build safe infrastructure for $H_2$ storage.

Over the years, the photochemical and electrochemical processes for splitting of water molecules have been among the most attractive alternatives for $H_2$ production. However, the dream remains to develop the cost-effective, eco-friendly, and environmentally benign electrolysis based commercial processes for $H_2$ production from water, which is regarded as the cleanest technologies among all. The recent advent of microfluidic reactors has provided the glimmer of hope to overcome the cost related issues of the electrolysis based commercial production of $H_2$ fuel. The prototype shown here proposes a simple methodology to produce $H_2$ from electrolysis of sea water inside a microfluidic reactor with the help of electrical energy produced from a photovoltaic cell. Apart from solar energy, naturally abundant sea water is employed as the raw material to reduce the installation and operating costs. Further, hydrostatic head is employed to flow the sea water into the microfluidic reactors to reduce the cost related issues for pumping. Process intensification through VLSI the proposed microfluidic reactors is expected match the rate of production of their macroscopic analogues in near future.

The microfluidic reactors have been playing a pivotal role in the modern era to revolutionize the industrial pathways of chemical synthesis. Design and development of microreactors having attributes similar or superior to their macroscopic counterparts have now become one of the most competitive areas of innovation. The microscale processes carry distinct advantages in handling the reactive systems because, (a) efficient use of costly raw materials, (b) superior energy management, (c) higher efficiency owing to the availability of larger surface to volume ratio for improved mass, momentum, and energy transport, and (d) VLSI of miniaturized technologies are capable of matching the rate of production of the macroscopic analogues at a much lower cost to company.

Presently, ~80% of the energy needs of the modern society are supported by the fossil fuels, which emits the major share of greenhouse gases responsible for global warming. A cleaner alternative in this regard is the use of photovoltaic or electrochemical cells, which have shown remarkable potentials to fulfill the needs of mobiles, calculators, computers [Ref. S. Ashley, *Fuel Cell Phones. Sci. Am.*, 2001, 285, 25.], portable electronics, and automobiles, among others. With rapid depleting reserve of fossil fuels with the ever increasing energy demand of the society, it is envisioned that the more-efficient and eco-friendly microfluidic fuel cells can replenish many if not all the applications based on fossil fuels. Thus, the need of the hour is large-scale and cost-effective commercial production of hydrogen, which is the major raw material for the electrochemical cells.

Hydrogen is among the most abundant materials on the earth, constituting 75% of baryonic mass and has been termed as the 'wonder fuel' because of its enormous energy density. The commercial way for the large-scale production of hydrogen has been the reforming of hydrocarbons. Water thermolysis, ammonia reforming [Ref.: R. M. Navarro, M. A. Pena and J. L. G. Fierro, *Hydrogen production reactions from carbon feed stocks: Fossil fuels and biomass. Chem. Rev.*, 2007, 107, 3952-3991.], oxidation of methane [Ref.: S. Freni, G. Calogero and S. Cavallaro, *Hydrogen production from methane through catalytic partial oxidation reactions. J. Power Sources*, 2000, 87, 28-38.] and biomass gasification have also been employed to produce this technologically important gaseous material. Concentrated solar power or photocatalytic decomposition of water are the other alternatives in which photoactive metals oxides, doped metal oxides, metal-oxy-sulfides/nitrides, semiconductors, and polymers have been testified to split water under the direct solar exposure. Alternatively, photoelectrochemical cells (PEC), thermochemical and photo electrolysis cells [Ref.: O. Khaselev and J. A. Turner, *A monolithic photovoltaic-photoelectrochemical device for Hydrogen Production via Water Splitting. Science*, 1998, 280, 425-427.] proton exchange membrane (PEM), and hybrid PV-PEC [Ref.: F. Barbir, *PEM electrolysis for production of hydrogen from renewable energy sources. Sol. Energy.*, 2005, 78, 661-669.] reactors have also been employed for water splitting and in situ hydrogen separation. The previous studies indicate that although there are numerous available technologies for hydrogen production in microscale domain, the most competitive ones are either photocatalytic or electrolytic decomposition of water.

Among the pioneering technological developments in the domain related to the photocatalytic decomposition of water, U.S. Pat. No. 4,367,131 proposed a photocatalyst made of one or more noble metals in finely divided form to improve the hydrogen production.

Later, U.S. Pat. No. 4,650,554 modified the design of photocatalytic reactors to minimize the backward recombination reaction of $O_2$ and $H_2$.

U.S. Pat. No. 7,338,590 developed porphyrin nanotube based photocatalyst to obtain hydrogen from water. Further, U. S. Patent Application 2012/0145532 prepared photocatalyst comprising of nanoparticles of Ag, Au, Pt, or Pd or an alloy of these metals or an alloy of these metals with Ni, which has been used as a core of a reactor shell made of a semiconductor like $TiO_2$, ZnS, and $Nb_2O_5$.

In a more recent development, U.S. Patent Application 2013/0248349A1 proposed a photocatalytic reactor in which one of the transparent walls allows facile illumination of the photocatalysts inside the reactor.

However, most of the photocatalytic decomposition methodologies face serious challenges in the development of eco-friendly, economic and biodegradable photoactive materials, which can absorb solar irradiation at a higher efficiency while floating inside opaque or translucent electrolyte in a vessel. In addition, the oxy-hydrogen produced in the photocatalytic cells often requires an additional strategy to separate hydrogen.

In this context, the cleanest and greenest among all the available technologies is the electrolysis of water, which shoulders only ~4% of commercial production owing to the serious limitation associated with the use of expensive electrical energy. The large-scale production of hydrogen through electrolysis of water employing the specialties of the microreactor technology has started gaining attention only in the recent years. For example, a few decades back U.S. Pat. No. 4,726,888 have employed the plurality of the electrodes to improve the energy efficiency of the hydrogen production. U.S. Pat. No. 4,265,721 has shown the utility of a resonant chamber for enhanced hydrogen production in which the chamber is exposed to a microwave frequency of 915 MHz to vibrate the molecules of the electrolyte.

U.S. Patent Application 2009/0139856A1 has shown the use of a distinct assembly by changing the shape and orientation of the electrode stack in an electrolytic cell.

U. S. Patent Application 2012/0149789A employed the concept of the patterned electrode to improve the electrolytic efficiency. In one of the very recent works U.S. Patent Application 2012/0097550A1 suggest that the electrolysis of water can be performed at lower voltage and at a higher efficiency under the combined effects of magnetic field, infra-red (IR) and acoustic vibration.

In another interesting study, U.S. Pat. No. 8,444,847B1 propose to split water at 1.23 V using aluminum or aluminum alloy anode, copper or copper alloy cathode, aqueous solution of aluminum sulfate as electrolyte, and ammonium salt catalyst in the electrolyzer.

However, until now there is hardly any technology available which could provide both environmentally benign and economically feasible solution for the production of hydrogen employing a microfluidic electrolyzer. Thus, there has been a need for developing a new microscale methodology to produce hydrogen under ambient conditions employing the naturally abundant resources to address the issues related to the cost-effectiveness of the commercially available electrolysis processes.

SUMMARY

It is the basic object of the present invention is to develop an environmentally benign and economically feasible microfluidic based system for the production and in situ separation of products hydrogen and/or oxygen from water such as naturally abundant sea water and involving solar energy.

Another object of the present invention is to develop a microfluidic electrolyzer or a microreactor, which would be adapted to continuously produce and separate in-situ the products, hydrogen and/or oxygen, from water, involving electrolysis of the water.

Yet another object of the present invention is to develop a solar powered microfluidic electrolyzer or a microreactor, which would be adapted to operate independent of any conventional pumping process to drive the fluid/water inside the microreactor and involve Gravitational potential to flow the water into the microfluidic reactor for the continuous production of hydrogen fuel through electrolysis of water under direct solar illumination.

Another object of the present invention is to provide a solar powered microfluidic electrolyzeror microreactor, which would be self-reliant, energy efficient, and easy to fabricate.

Thus, according to the basic aspect of the present invention there is provided a microfluidic reactor for continuous generation and in-situ separation of products hydrogen and/or oxygen from water comprising a substrate;

a microchannel embedded with respect to said substrate and providing a water inlet end at one end and a product outlet at the other end of the substrate;

pair of electrodes each having at least an operative end inserted within the microchannel constituting an anode and a cathode, one ahead of the other, from the said water inlet end and maintained in direct contact with the water flowing inside the microchannel for desired high intensity electric field to generate said products oxygen and hydrogen involving electrolysis of the water; and in situ separate pathways of the produced hydrogen and oxygen free of any mixing with each other.

According to another aspect in the present microfluidic reactor for in situ separation of hydrogen and oxygen from water, the electrodes acting as the cathode and the anode are placed lateral to the microchannel;

said anode and the cathode are placed in substantially perpendicular to the micro-channel and with separation distance to maintain higher field intensity;

said in-situ separate pathways of the produced hydrogen and oxygen free of any mixing with each other comprising a first separator pathway adjacent to the first of said electrode along the water flow line such that the first product generated by said first electrode is immediately separately collected ahead of the second electrode generating the other second product free of any inter mixing, a separate downstream pathway disposed after said second electrode generating the other second product operatively connected to an outlet for separate collection.

According to another aspect in the present microfluidic reactor for in situ separation of hydrogen and oxygen from water, the first electrode is a cathode electrode and the separate pathway adjacent thereto is for collection of hydrogen gas and the said second electrode comprises anode electrode and said outlet for separate collection disposed after said anode electrode provide for collection of oxyhydrogen gas.

According to yet another aspect, the present microfluidic reactor for in-situ separation of hydrogen and oxygen from water for production and separation of the hydrogen includes said anode placed at the downstream of the reactor;

said separate pathways for in situ separation of the produced hydrogen from other byproduct oxygen comprising an additional outlet fabricated near the cathode positioned before the anode at the downstream of the water flow within the microchannel thus facilitating electrolysis generated hydrogen gas to pass through before mixing with the oxygen gas stream near the anode.

According to a further aspect, the present microfluidic reactor for in situ separation of hydrogen and oxygen from water for production and separation of the oxygen includes said cathode placed at the downstream of the reactor;

said separate pathways for in situ separation of the produced oxygen from other byproduct hydrogen comprising an additional outlet fabricated near the anode positioned before the cathode at the downstream of the water flow within the microchannel thus facilitating electrolysis generated oxygen gas to pass through before mixing with the hydrogen gas stream near the cathode.

According to yet another aspect in the present microfluidic reactor for in situ separation of hydrogen and oxygen from water, the anode and the cathode are disposed electrically connected with solar PV cell to provide direct current electric field to the anode and the cathode for electrolysis.

According to a further aspect in the present microfluidic reactor for in situ separation of hydrogen and oxygen from water, the water for electrolysis preferably includes seawater.

According to another aspect in the present invention there is provided a microfluidic electrolyzer for production and separation of hydrogen from water comprising a housing having power source;

a water reservoir for supply of water for electrolysis;

a downstream microfluidic reactor having an anode and cathode electrodes operatively connected to said power source;

downstream thereunder said microfluidic reactor collector means for separated gases emanating from said microfluidic reactor;

said disposition of the water reservoir, microfluidic reactor and collector means providing for gravity based flow for product and separation of the generated products.

According to a further aspect in the present microfluidic electrolyzer for production and separation of hydrogen from water, the power source preferably includes solar PV panel disposed on top of the housing.

According to yet another aspect in the present microfluidic electrolyzer for production and separation of hydrogen from water, the downstream microfluidic reactor includes a substrate;

a microchannel embedded with respect to the substrate and providing a water inlet end at one end and a product outlet at the other;

pair of electrodes each having at least an operative end inserted within the micro-channel constituting an anode and a cathode, one ahead of the other, from the said water inlet end and maintained in direct contact with the water flowing inside the microchannel for desired high intensity electric field to generate said products oxygen and hydrogen involving electrolysis of the water and insitu separate pathways of the produced hydrogen or oxygen free of any mixing with each other.

According to yet another aspect in the present microfluidic electrolyzer for production and separation of hydrogen from water, the microfluidic electrolyzer comprises an input with a connected reservoir resting on a reservoir stage within an enclosure placed at higher elevation of said enclosure for receiving and temporarily storing the water;

said microfluidic reactor disposed operatively connected to the reservoir and resting on a reactor stage within the enclosure at an intermediate elevation of the enclosure facilitating flow of the water from the reservoir at the higher elevation into the microfluidic reactor inlet at the intermediate elevation for electrolysis and in situ separation of the hydrogen from other byproduct oxygen;

a hydrogen collecting chamber operatively connected to the microfluidic reactor outlet and resting on a chamber stage within the enclosure at the lower elevation to receive and store the generated hydrogen from the reactor.

According to another aspect, the present microfluidic electrolyzer comprises a solar PV panel disposed over the enclosure having electrical connectivity with the anode and the cathode of the microfluidic reactor, wherein the solar PV panel generates electricity which create high intensity electric field inside the microfluidic reactor's microchannel though the anode and the cathode assembly.

According to yet another aspect in the present microfluidic electrolyzer, the enclosure and the stages for holding the reservoir, reactor, and the chamber are prepared by cutting the poly-methyl methacrylate (PMMA) sheets into pieces and then joining them through adhesives.

In accordance with another aspect in the present invention there is provided a method for fabricating the microfluidic reactor including template molding of chemically inert, mechanically robust, biocompatible, optically transparent, economic, and thermally stable material such as polymer poly-dimethyl siloxane (PDMS), said template molding based fabrication of the microfluidic reactor comprising (i) preparation of the template by involving stainless steel tailor needles and then (ii) casting of PDMS inside the template.

According to another aspect, the present method for fabricating the microfluidic reactor involving stainless steel tailor needles as template by joining the needles with the help of adhesives to form a needle structure resembling with desired shape of the microfluidic reactor;

creating trench of desired dimensions on a glass slide using double sided tapes and fixing the needle structure on the trench;

pouring cross-linker and pre-polymer mixture 1:10 (v/v) solution all over the trench and curing the same at 60° C. for 40 minutes to obtain PDMS cake embedded with channels by involving silicon hydride based curing agent, wherein the silicon hydride groups present in the curing agent reacted with vinyl groups of the pre-polymer to form a cross-linked elastomeric solid cake;

removing the elastomeric solid cake from the glass slide after taking away the double sided tapes and dipping into acetone to remove the needles by inflating the microchannels;

cleaning the microchannels by using ultra-sonication in acetone and methanol baths for 10 minutes followed by treatment with 10% (v/v) piranha solution ($H_2SO_4:H_2O_2$, 3:1) for 15 minutes and then washing the channels repeatedly with DI water and drying before using;

inserting Cu electrodes through the lateral empty microchannels channels on the PDMS cake.

BRIEF DESCRIPTION OF THE DRAWINGS

FIGS. 4A to 4C show the isometric, top, and side views of the prototype, respectively.

FIGS. 5A to 5C show the isometric, top and side views of the prototype, respectively.

FIG. 6A shows the trench dimensions on a glass slide FIG. 6B shows the PDMS cake embedded with the electrodes and the microchannel area after curing FIG. 6C shows the PDMS cake with an additional outlet near the cathode for in situ hydrogen separation after the electrolysis.

DETAILED DESCRIPTION

As discussed herein before, the present invention discloses polymeric microfluidic electrolyzer designed and developed for the continuous production and then separation of hydrogen from the naturally abundant resources sea water and solar energy. The invention is directed to provide an environmentally benign and economically acceptable 'green' solution for large scale production of the 'clean' hydrogen fuel. The microfluidic reactor of the present invention is fabricated through a low cost template molding technique.

Figure 1:
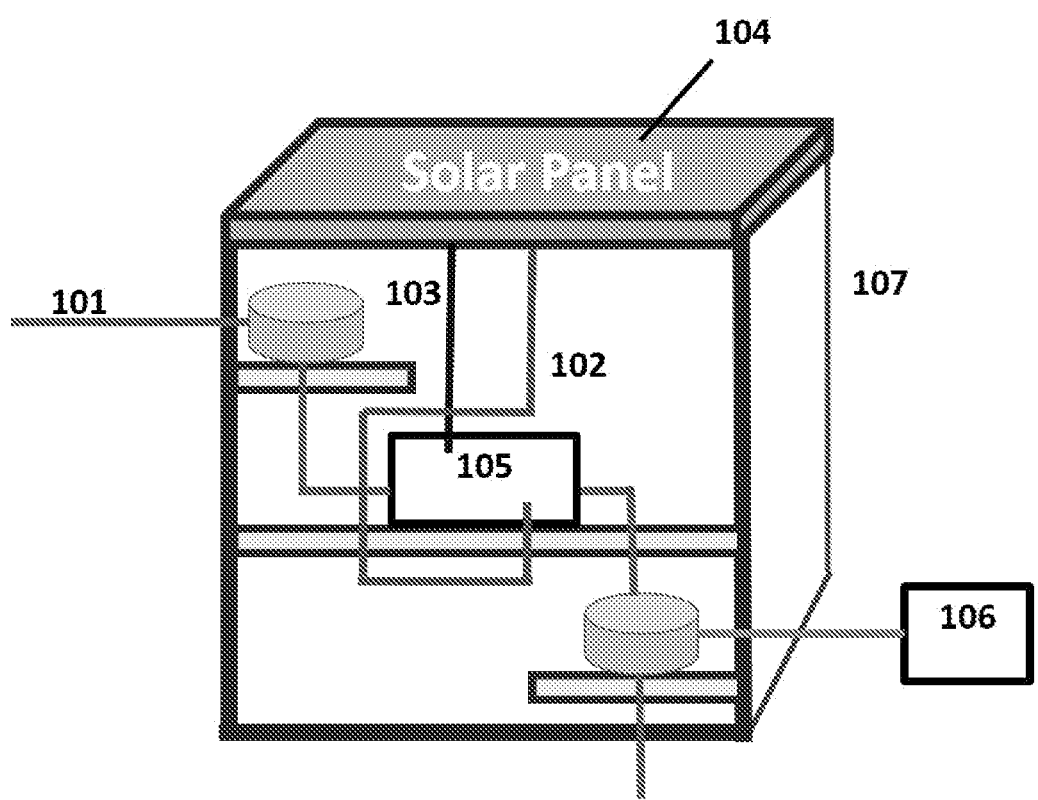
FIG. 1 shows a schematic representation of a preferred embodiment of microfluidic electrolyzer with solar (PV) panel in accordance with the present invention.

Reference is first invited from the accompanying FIG. 1 which shows a preferred embodiment of the present microfluidic electrolyzer with solar (PV) panel. The microfluidic electrolyzer of the present invention basically includes an input (101) for receiving sea water, a microfluidic reactor (105) to electrolyze the sea water in order to separate hydrogen in situ from other byproduct oxygen, a cathode (103) and anode (102) assembly operatively integrated with the reactor (105) to provide high intensity electric field into the reactor for electrolyzing of the sea water and an output (106) for issuing out of the hydrogen gas from the present microfluidic electrolyzer. All the components of the microfluidic electrolyzer are housed in an enclosure (107) preferably made of Perspex (PMMA) and selectively disposed in said enclosure (107) to enable flow of the sea water into the microfluidic reactor from the inlet.

A solar panel is disposed over the enclosure (107). The electrical connectivity of the anode (red line or the line with lighter shade) and cathode (black line or the line with darker shade) from PV cell of the solar panel is shown in FIG. 1. Under solar illumination, the solar PV panel generates electricity which create high intensity electric field inside the microfluidic reactor though the anode and the cathode assembly.

Figure 2:
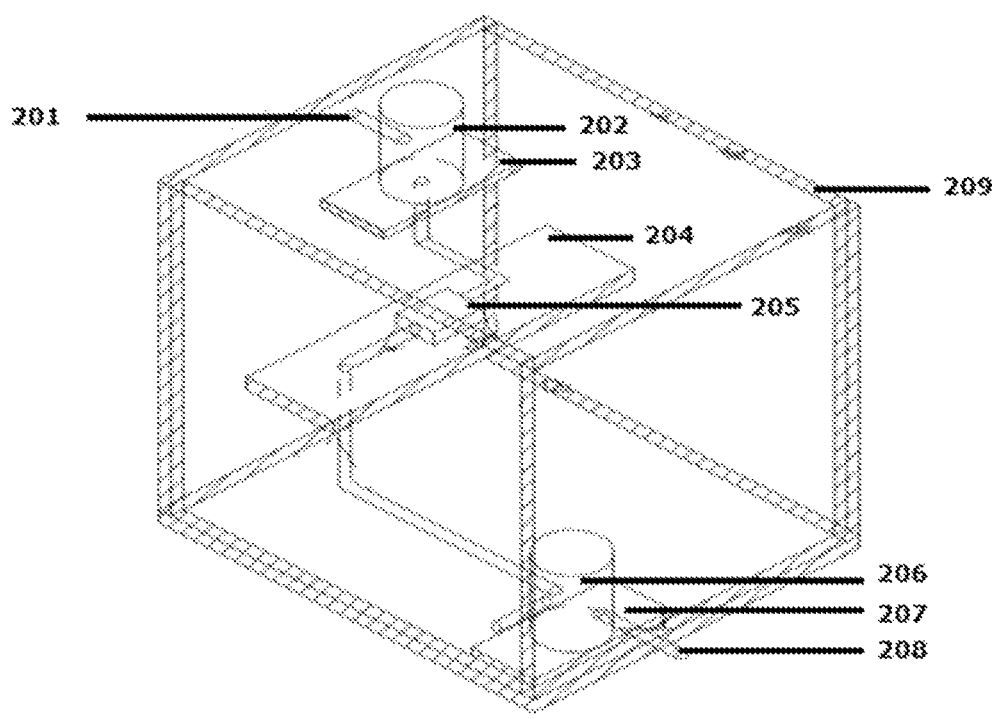
FIG. 2 shows schematic representation of the present microfluidic electrolyzer embodiment in absence of the solar panel.

Reference is next invited from FIG. 2, which schematic representation of the above microfluidic electrolyzer embodiment in absence of the solar panel. As shown in the referred figure, components of the microfluidic electrolyzer are housed within an enclosing box (209) made up of Perspex. The sea water is first flown in the microfluidic electrolyzer through the input (201). The inlet is connected with a reservoir (202) for temporarily storing the sea water.

The reservoir (202) is placed within the enclosing box (209) at a higher elevation resting on a reservoir stage (203). The microfluidic reactor (205) is positioned within the enclosing box (209) at an intermediate elevation resting on a reactor stage (204). A silicon tube is used to connect the reservoir (202) with collector of the microfluidic reactor (205) which facilitating flow of the sea water from the reservoir (202) at the higher elevation into the microfluidic reactor (205) at the intermediate elevation in which the electrolysis takes place to generate hydrogen from the sea water with the help of the electric field created by the anode and the cathode assembly (not shown in FIG. 2).

A hydrogen collecting chamber (206) is provided within the enclosing box (209) resting on a chamber stage (207) at the lower elevation. The chamber (206) is disposed in with the microfluidic reactor (205) output through a silicon tubing to receive and store the generated hydrogen from the reactor (205). The hydrogen gas can be collected from the chamber (206) through the output (208).

Figure 3A:
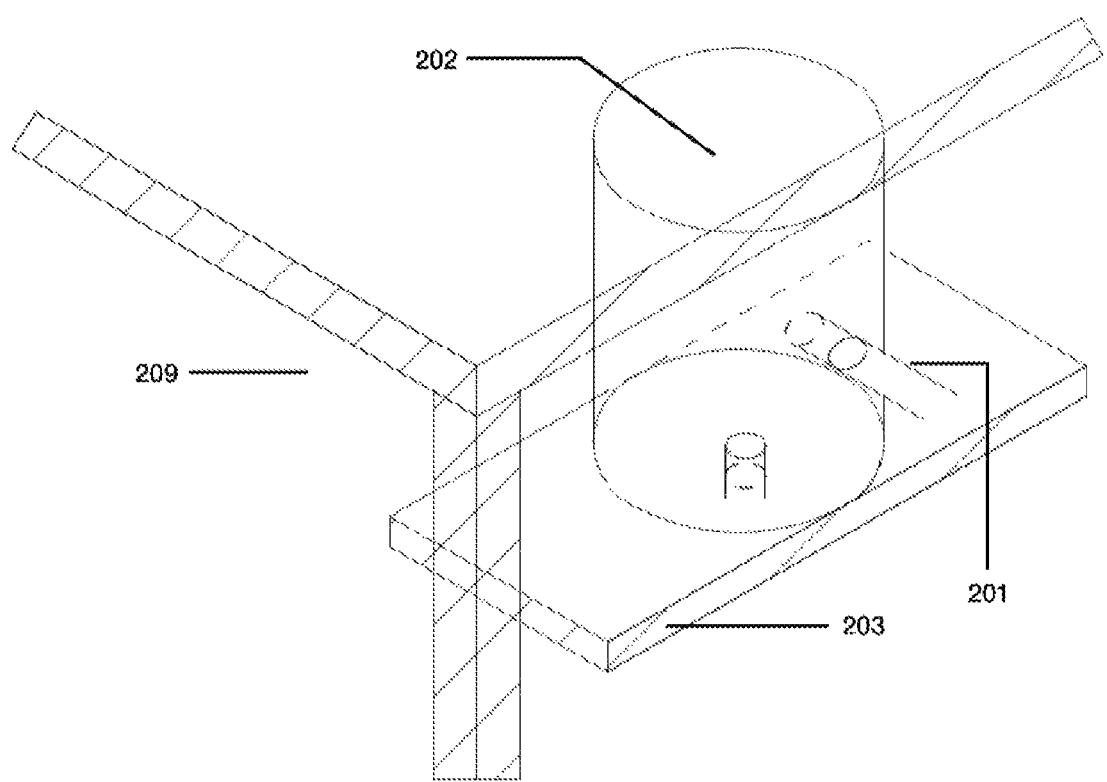
FIGS. 3A and 3B show schematic representations of input sea water reservoir (FIG. 3A) and hydrogen collector inside the present microfluidic electrolyzer embodiment (FIG. 3B).
Figure 3B:
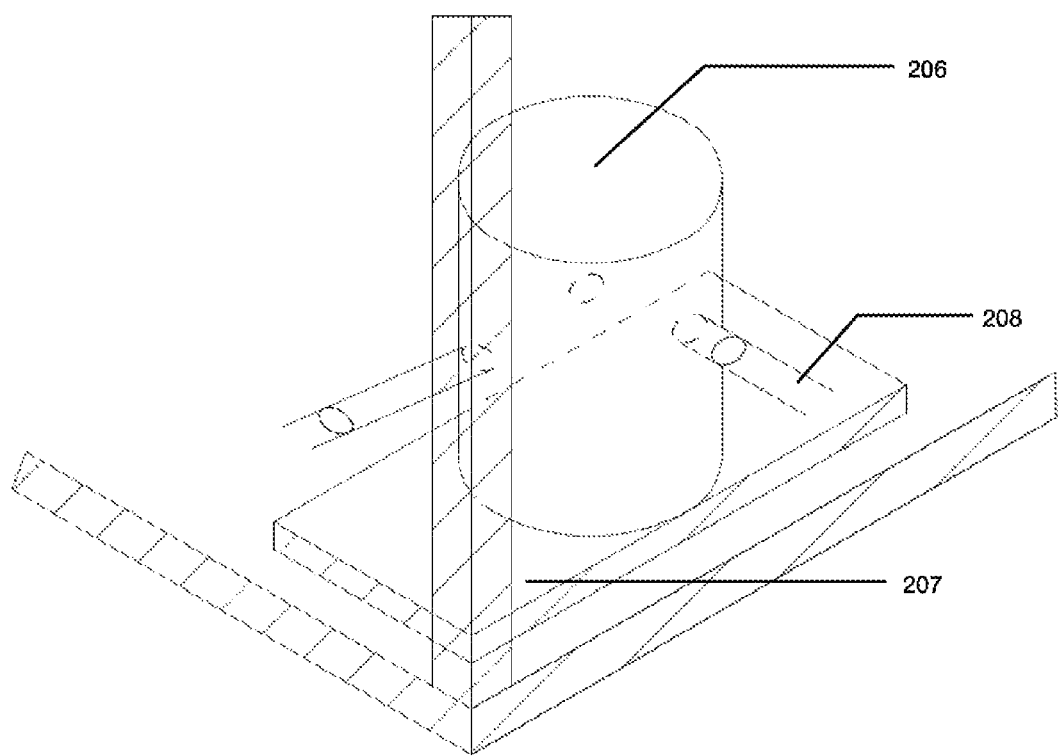

The accompanying FIG. 3A shows the isometric view of a preferred embodiment of the input sea water reservoir (202) which is cylindrical in shape and resting on the reservoir stage (203). Similarly, the accompanying FIG. 3B shows the isometric view of a preferred embodiment of the output hydrogen collecting chamber (206) which is also cylindrical in shape and resting on the chamber stage (207).

Figure 4A:
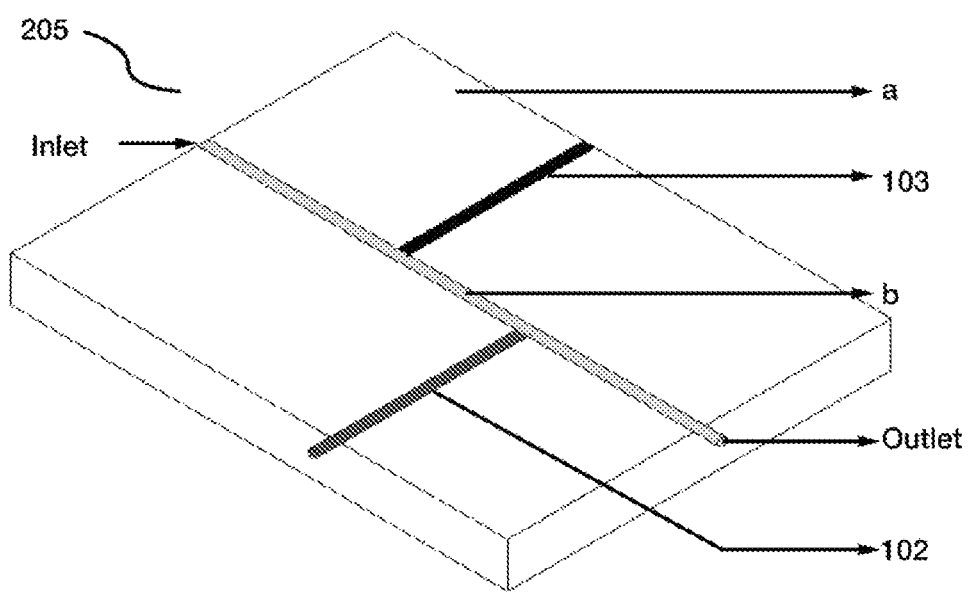
FIGS. 4A to 4C show schematic representations of microfluidic reactor placed inside the present microfluidic electrolyzer.
Figure 4B:
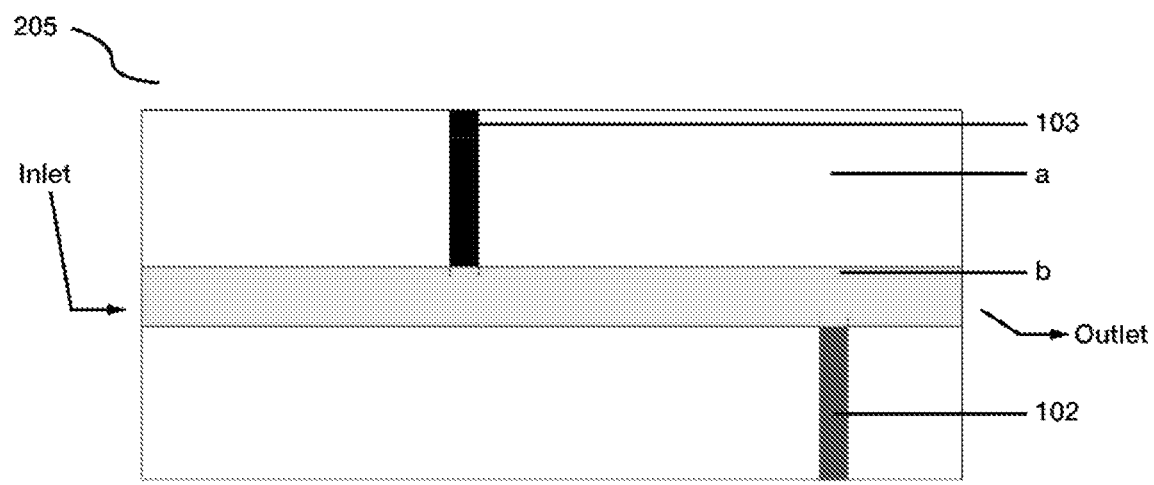
Figure 4C:
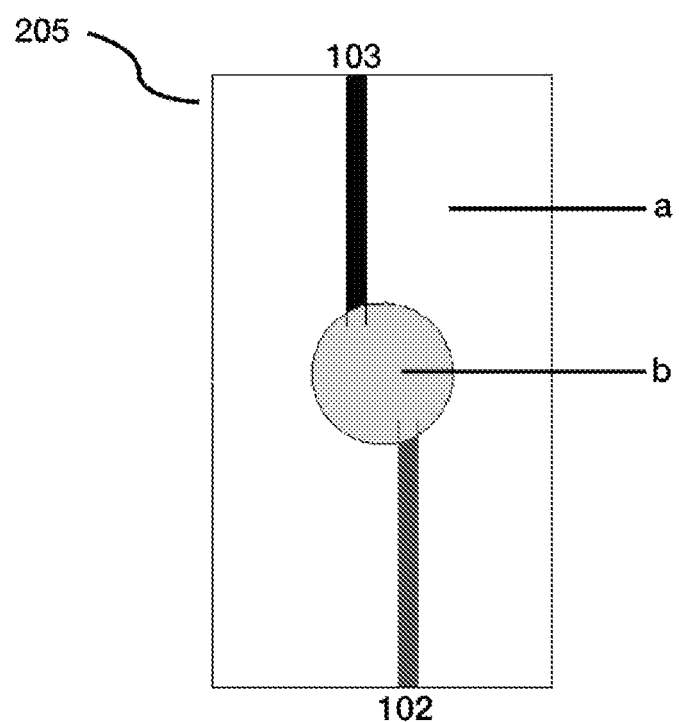

Reference is next invited from the accompanying FIGS. 4A to 4C which show the schematic representations of a preferred embodiment of the present microfluidic reactor (205) placed inside the present microfluidic electrolyzer in which the sea water is flown at different flow rates using hydrostatic head.

As shown in the referred figures, the microfluidic reactor for in situ separation of hydrogen and oxygen from the sea water basically includes a substrate (a) having inlet for inputting the water and outlet for outputting the separated hydrogen and oxygen, a microchannel (b) embedded within the substrate and connecting the inlet and the outlet of the reactor substrate to provide flow path to the sea water inputted through the inlet of the reactor and a pair of metallic electrodes (102, 103) having at least an operative end inserted within the micro-channel (b) constituting an anode (102) and a cathode (103), one ahead of the other, from the said water inlet end and maintained in direct contact with the water flowing inside the microchannel for desired high intensity electric field to generate said products oxygen and hydrogen involving electrolysis of the water.

The electrodes are embedded in the substrate lateral to the microchannel ensuring the electrodes to be in direct contact with the sea water while it flows through the microchannel (b) for electrolyzing. The anode (102) and the cathode (103)

are placed in the perpendicular direction to the microchannel in which the anode is placed at the downstream of the reactor to get higher efficiency in hydrogen collection, as shown in the FIGS. 4A to 4C. The separation distance between the anode and the cathode electrodes is kept narrow to maintain higher field intensity.

When the electrodes, connected to the PV cell is brought in contact with sea water inside the micro-channel, the $H_2$ and $O_2$ gases are produced. The electrolysis of water ($2H_2O=2H_2+O_2$) produced oxygen near the anode and hydrogen near the cathode. In order to engender in situ separation of hydrogen and oxygen, the in-situ separate pathways which include one additional outlet (ch) is fabricated in the upstream of the microchannel. The insitu separate pathways facilitates outputting of the produced hydrogen and oxygen free of any mixing with each other comprising a first separator pathway adjacent to the first of said electrode along the water flow line such that the first product generated by said first electrode is immediately collected ahead of the second electrode generating the other second product free of any inter mixing, a separate downstream pathway disposed after said second electrode generating the other second product operatively connected to the reactor outlet for separate collection.

Figure 5A:
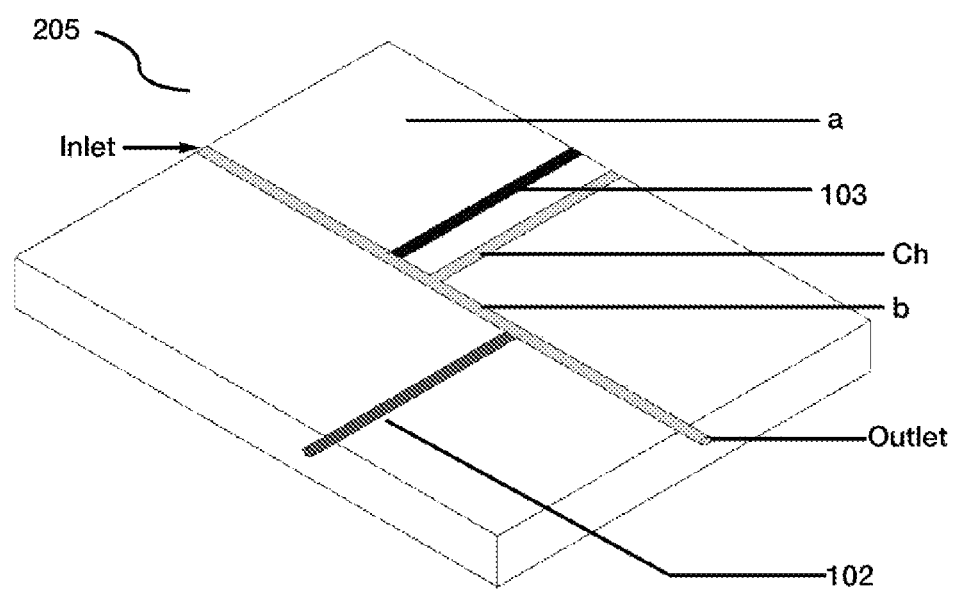
FIGS. 5A to 5C show schematic representations of the present microfluidic reactor with a hydrogen separator.
Figure 5B:
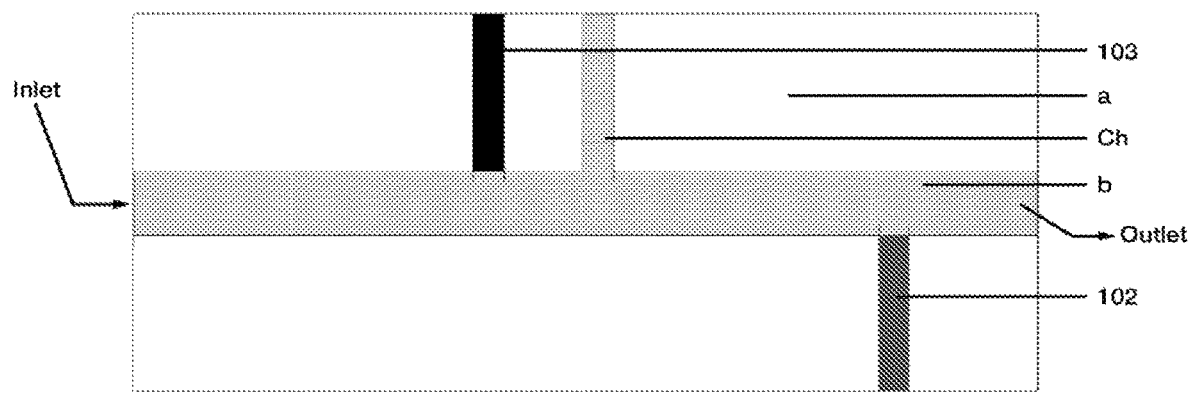
Figure 5C:
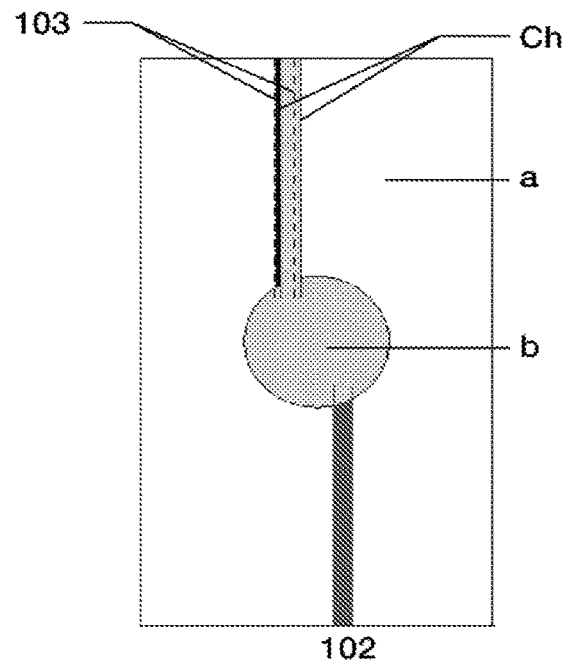

In order to engender in situ separation of hydrogen and oxygen, the in-situ separate pathways which include one additional outlet (ch) is fabricated in the upstream of the microchannel near the cathode which is positioned before the anode at the downstream of the seawater flow within the microchannel, as shown in FIGS. 5A to 5C. The additional outlet channel near the cathode facilitates the electrolysis generated hydrogen gas to pass through before mixing with the oxygen gas stream near the anode.

Similarly, in an alternate embodiment of the reactor, the electrodes positions are altered to produce pure oxygen wherein the anode is placed at the upstream side of the channels to facilitate passing of the pure oxygen through the additional outlet (ch).

The enclosing box of the present microfluidic electrolyzer can be prepared by cutting the Perspex sheets into pieces and then joining them through adhesives. Typically, the Perspex box to enclose the present microfluidic electrolyzer's components can be sized about $150\times130\times135$ mm$^3$. The stages for holding the reservoir, reactor, and the chamber are also prepared by cutting the Perspex sheets and then joining them within the box enclosure inner wall with adhesives at their respective altitudes in the box.

The solar panel is attached on the top of the structure, and it preferably includes a series of commercially available inorganic photovoltaic solar cells to supply high intensity direct current electric field to the anode and the cathode under solar irradiation.

The fabrication of the microfluidic reactor is a critical step of the present invention and in the present work it is prepared by template molding of chemically inert, mechanically robust, biocompatible, optically transparent, economic, and thermally stable material such as polymer PDMS.

Analytical grade acetone and ethanol are also employed as solvents in the reactor fabrication procedure and Single strand copper (Cu) wires of diameter ~220 μm are employed as the electrode materials.

The microfluidic reactor is fabricated in two steps: (i) preparation of the template and then (ii) casting of PDMS inside the template.

Figure 6A:
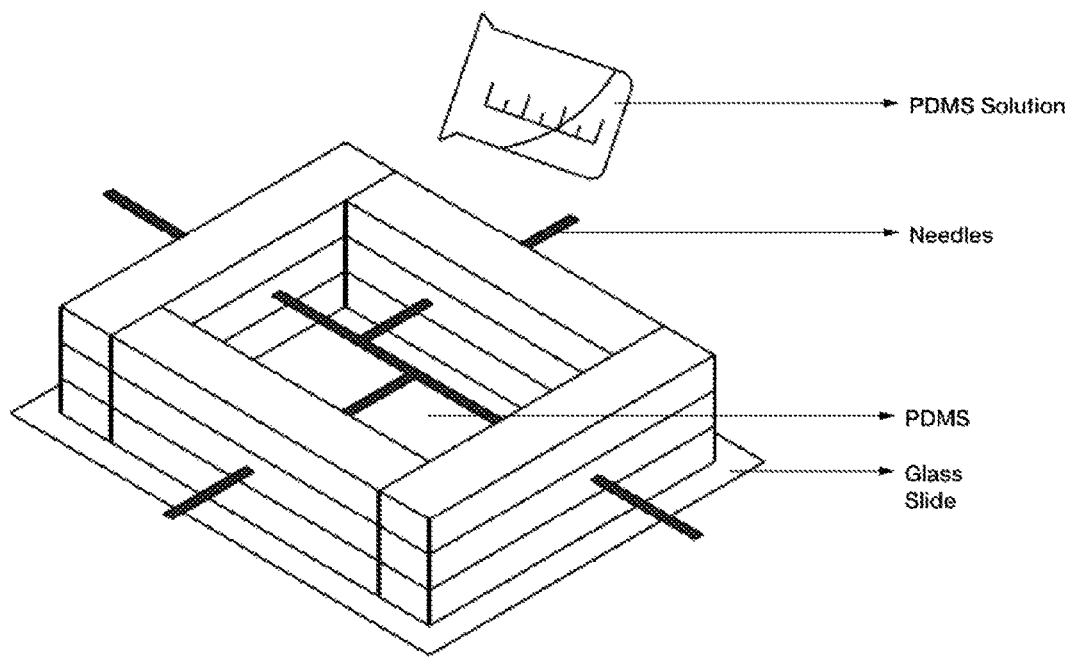
FIGS. 6A to C show schematic representations of the procedure for microchannel fabrication.

Stainless steel tailor needles of diameter ~500 μm are used as template because of their superior tensile strength and smoothness on the surface. A trench of known dimensions, e.g., 50 mm (length)×32 mm (width)×20 mm (height), is created on a glass slide using the double sided tapes. Then the needles are joined with the help of adhesives to get the desired shape of the microfluidic reactor, as shown in FIG. 6A. In parallel to this, a 1:10 (v/v) solution of cross-linker and pre-polymer is mixed together before keeping the solution in vacuum for 40 minutes to remove the entrapped bubbles.

Figure 6B:
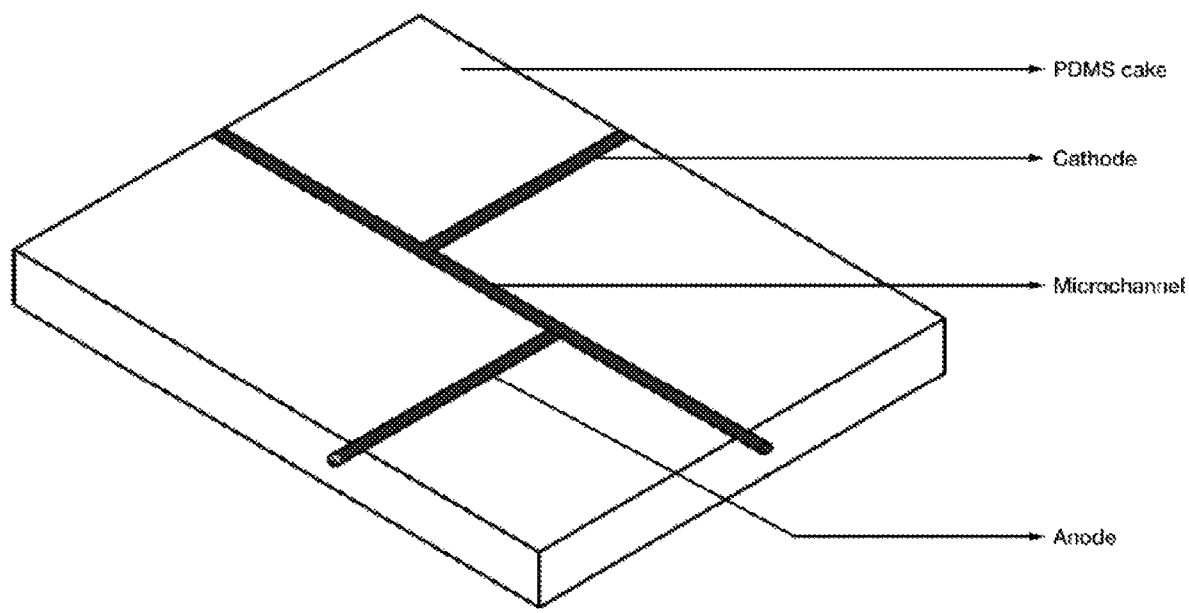

Thereafter, the needle structure is hung on the trench before pouring the cross-linker and pre-polymer mixture all over the trench, as shown in FIG. 6B.

Figure 6C:
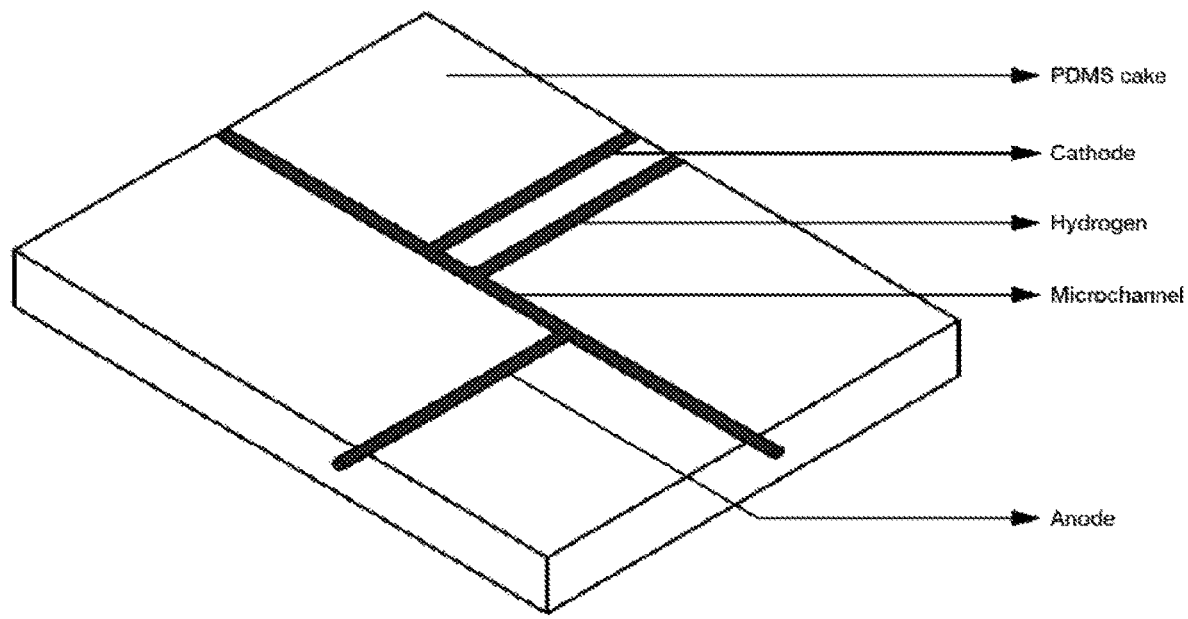

The PDMS cake embedded with the channels is obtained after curing the aforementioned system at 60° C. for 40 minutes. The silicon hydride groups present in the curing agent reacted with vinyl groups of the pre-polymer to form a cross-linked elastomeric solid cake. The cake, as shown in FIG. 6C, is taken out from the glass slide after removing the double sided tapes before dipping into acetone to remove the needles by inflating the microchannels.

The microchannels are cleaned using standard protocols before any experiment is conducted further. For this purpose, initially, they are ultra-sonicated in acetone and methanol baths for 10 minutes followed by treatment with 10% (v/v) piranha solution ($H_2SO_4:H_2O_2$, 3:1) for 15 minutes. The channels are washed repeatedly with DI water and dried before using. The microchannels typically had the diameter of ~500 μm, as verified under optical microscope, Leica DM 2500. The Cu electrodes necessary for the electrolysis inside the microfluidic reactor are inserted through the lateral empty channels, as shown in FIG. 6C. The electrodes are placed in the perpendicular direction to the microchannel in which the anode was placed at the downstream of the reactor to get higher efficiency in hydrogen collection, as shown in FIGS. 5A to 5C.

Result:

A direct current (DC) electric field is applied into the microfluidic reactor by integrating the Cu electrodes with the PV panel [Topsun™ having maximum open (close) circuit voltages of 21.5 V (19.5 V), respectively]. The solar panel is kept for 2 hours under direct illumination for stabilization of the power supply and the output voltage was measured with the digital multimeter.

Figure 7A:
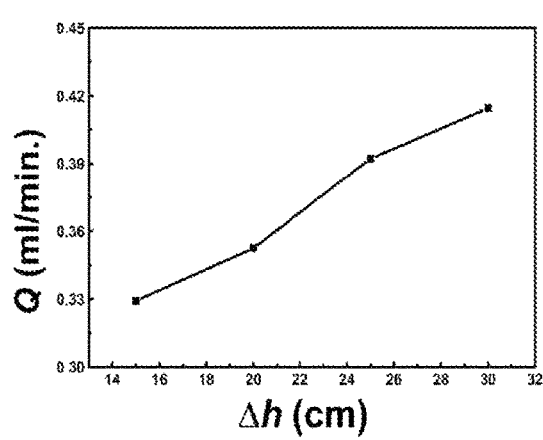
FIG. 7A shows the calibration of flow rates (Q) of sea water with the variation in the hydrostatic head ($\Delta$h).

In FIGS. 7A to 7D one set of data in which the applied voltage was 20 V and the volumetric flow rate of the fluid (Q) was varied by varying the elevation of the sea water reservoir (Δh) has been reported. The variations in the flow rates of sea water into the microreactor with the change in the hydrostatic head were also performed, as shown in FIG. 7A. For this purpose, the elevation of the reservoir filled with sea water was changed to tune the flow rate inside the electrolyzer. The amount of fluid coming out of the reservoir per unit time was assumed to be the volumetric flow rate (Q) of the fluid. The typical variations in Q of the sea water with the change in the elevation in the reservoir are depicted in FIG. 7A. The figure suggests that with increase in the difference in elevation between the reservoir and the microfluidic reactor Q of the sea water increased linearly.

In order to determine the amount of oxygen and hydrogen produced by the electrolyzer a calibration plot has been prepared by employing the pure gases using gas chromatography (Bruker, 450 GC). The GC employed a Varian capillary column [CP—Wax52, packing: Carbosieve SII (80-100 mesh), dimension 1.80 m×⅛"×2.0 mm stainless steel, maximum temperature: 225° C.] integrated with a thermal conductivity detector (TCD) for gas detection. The injector, oven, and detector temperatures were fixed at 100° C. while the carrier gas nitrogen was flown at 10 ml/min. In order to obtain the calibration plots, different volumes of pure $H_2$ and $O_2$ gases ranging from 0.1 ml to 1 ml were injected manually in the TCD port of the GC with the help of Hamilton 100 µl gas tight microsyringe, which showed peaks of $H_2$ at the retention time of ~0.7-0.9 min and $O_2$ at the retention time of ~1.5-2.0 min. The linear correlation between the volumes of pure hydrogen ($V_H$) and oxygen ($V_O$) gases with corresponding areas under the curves ($A_O$ and $A_H$) were obtained as, $A_H=(1.14947\times10^6) V_H \pm 6050.93$ and $A_O=(3.227\times10^4) V_O \pm 358.28$. Following this, the gaseous products issuing out of reactor were analyzed in the GC under the same condition. For every experiment, a dose of 5 ml of sea water was injected through the channel for electrolysis and the gases issuing out of the reactor was collected in the collection chamber.

Figure 7B:
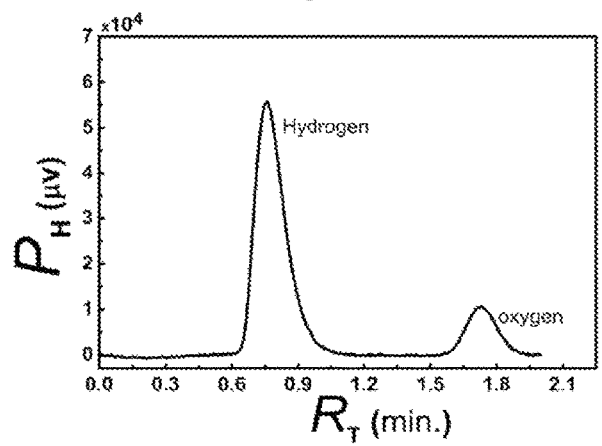
FIG. 7B shows the GC results of the gas issuing out of the microfluidic electrolyzer.
Figure 7C:
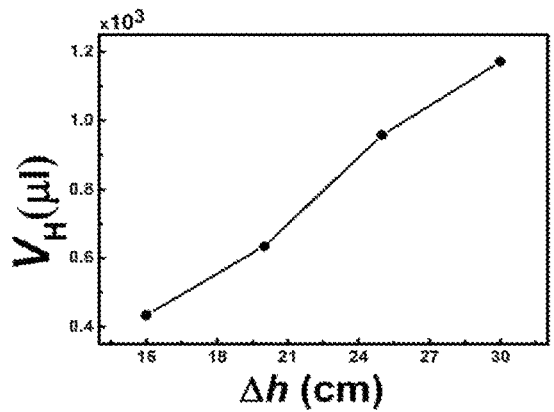
FIG. 7C shows the variation in the volume of hydrogen ($V_H$) produced with $\Delta$h when electric field of 19.5 V.
Figure 7D:
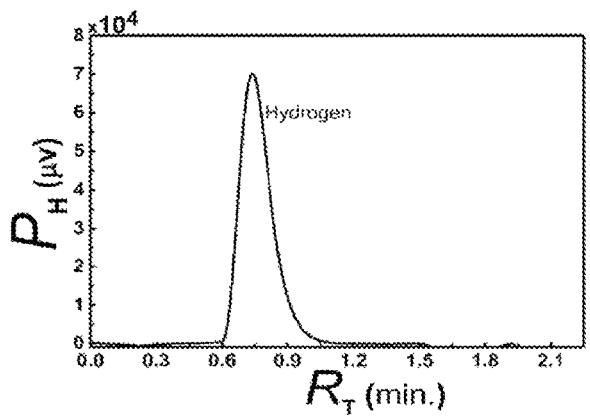
FIG. 7D shows the gas chromatograph (GC) results of the gas issuing out of the microfluidic electrolyzer cum separator.

FIG. 7B shows the typical GC analysis of the product collected from microfluidic reactor where the peaks at the retention times, ~0.72 min and ~1.83 min correspond to $H_2$ and $O_2$, respectively. In this plot, $P_H$ represents the peak intensity of the hydrogen and oxygen gas obtained from the GC integrated with a thermal conductivity detector (TCD) for gas detection. Interestingly, the ratio, $A_H:A_O$, nearly matched the reaction stoichiometry 2:1 for the mixture obtained from the microreactor. FIG. 7C suggests that under direct solar illumination the electrolyzer could produce hydrogen and the volume of hydrogen ($V_H$) increased with increase in Q when the applied voltage was kept constant at 19.5 V. The plot suggests that integrating ~850 such microreactors is expected to continuously produce 1 liter of $H_2$ in a min with the help of this device when the flow rate of sea water is 0.40 ml/min and applied voltage was as low as 19.5 V employing the PV cells. The wattage was estimated to be ~1.63 W, which is remarkably less than the commercially available processes. Interestingly, the microfluidic electrolyzer without the separator produced a mixture of oxygen and hydrogen as shown in FIG. 7B. FIG. 7D shows a typical GC plot of the gaseous products from the microfluidic electrolyzer, which had a built in separator, as shown in FIGS. 5A to 5C and FIGS. 6A to C. The plot suggests that the hydrogen gas obtained from the microfluidic electrolyzer cum separator was pure and devoid of any oxygen impurity (no peak ~1.5-2.8 min).

The major advantages of the present invention are listed hereunder:

The electrolysis process was economic than the commercially available ones because the naturally abundant solar energy was employed for electrolysis and hydrostatic head was used for the fluid flow.

Two major energy consuming components of commercially available electrolysis process were not employed, (a) electrical energy from fossil fuels and (b) pumping of fluids.

Even for electrolysis, lower power was required to produce same amount of hydrogen because a lower electrical resistance was experienced when the electrodes were separated by smaller distance.

The process intensified instrument was portable and required smaller space for installation.

The entire setup was easy to assemble, maintain, and devoid of the use of any costly fabrication equipment.

The device was also very economic as the building blocks were readily available in the market at affordable price.

Given the detailed methodology, the device can be assembled by non-technical persons.

The device can be integrated with multiple microfluidic reactors for large scale hydrogen production.

Hydrogen could be separated out from oxygen with a simple modification of the electrolyzer geometry. The polymeric microfluidic electrolyzer could produce and separate hydrogen in situ.

The method was energetically self-reliant because it employed solar energy to generate the electric field for the electrolysis and employed hydrostatic head to maintain the continuous sea water flow inside the channel.

The device is environment friendly because it does not use fossil fuel and employ natural resources as raw material and for energy need.

We claim:

1. A microfluidic reactor for continuous generation and in situ separation of products hydrogen and/or oxygen from water comprising:

a substrate;

a microchannel embedded with respect to said substrate and providing a water inlet at one end and a product outlet at the other end of the substrate;

pair of electrodes each having at least an operative end inserted within the microchannel constituting an anode and a cathode, one ahead of the other, from the said water inlet end and maintained in direct contact with the water flowing inside the microchannel for desired electric field to generate said products oxygen and hydrogen involving electrolysis of the water; and in situ separate pathways of the produced said products hydrogen and/or oxygen free of any mixing with each other comprising:

a first separator pathway adjacent to first of said pair of electrodes along the microchannel enabling first of said products generated by said first electrode to be immediately separated and collected ahead of second electrode of said pair of electrodes generating the other second of said products, free of any inter mixing with the first of said products; and a separate downstream pathway disposed after said second electrode generating said other second product operatively connected to the product outlet for separate collection.

2. The microfluidic reactor for in situ separation of hydrogen and oxygen from water as claimed in claim 1, wherein the electrodes acting as the cathode and the anode are placed lateral to the microchannel;

said anode and the cathode are placed in substantially perpendicular to the microchannel and a very small separation distance between the electrodes to maintain higher electric field intensity; and said in situ separate pathways of the produced hydrogen and oxygen are free of any mixing with each other.

3. The microfluidic reactor for in situ separation of hydrogen and oxygen from water as claimed in claim 2, for production and separation of the hydrogen includes:

said anode placed at the downstream of the reactor; and said separate pathways for in situ separation of the produced hydrogen from other byproduct oxygen is fabricated near the cathode positioned before the anode at the downstream of the water flow within the microchannel thus facilitating electrolysis generated hydrogen gas to pass through before mixing with the oxygen gas stream near the anode.

4. The microfluidic reactor for in situ separation of hydrogen and oxygen from water as claimed in claim 2, for production and separation of the oxygen includes:

said cathode placed at the downstream of the reactor; and said separate pathways for in situ separation of the produced oxygen from other byproduct hydrogen is fabricated near the anode positioned before the cathode at the downstream of the water flow within the microchannel thus facilitating electrolysis generated oxygen gas to pass through before mixing with the hydrogen gas stream near the cathode.

5. The microfluidic reactor for in situ separation of hydrogen and oxygen from water as claimed in claim 1, wherein said first electrode is a cathode and the separate pathway adjacent thereto is for collection of hydrogen gas and the said second electrode comprises anode and said outlet for separate collection disposed after said anode electrode provide for collection of oxygen gas.

6. The microfluidic reactor for in situ separation of hydrogen and oxygen from water as claimed in claim 1, wherein the anode and the cathode are disposed electrically connected with solar PV cell to provide direct current electric field to the anode and the cathode for electrolysis.

7. The microfluidic reactor for in situ separation of hydrogen and oxygen from water as claimed in claim 1, wherein the water for electrolysis includes seawater.

8. A microfluidic electrolyzer for production and separation of hydrogen from water comprising:
   a housing having power source;
   a water reservoir for supply of water for electrolysis;
   the microfluidic reactor of claim 1 in downstream of the water reservoir having the anode and the cathode electrodes operatively connected to said power source; and
   downstream thereunder said microfluidic reactor collector for separated gases emanating from said microfluidic reactor;
   said disposition of the water reservoir, the microfluidic reactor and the collector providing for gravity based flow for product and separation of the generated products.

9. The microfluidic electrolyzer as claimed in claim 8, wherein said power source includes solar PV panel disposed on top of the housing.

10. The microfluidic electrolyzer as claimed in claim 8, comprises:
    an input connected with the water reservoir which is resting on a reservoir stage within an enclosure placed at higher elevation of said enclosure for receiving and temporarily storing the water;
    said microfluidic reactor is disposed operatively connected to the reservoir and resting on a reactor stage within the enclosure at an intermediate elevation of the enclosure facilitating flow of the water from the reservoir at the higher elevation into the microfluidic reactor inlet at the intermediate elevation for electrolysis and in situ separation of the hydrogen from other byproduct oxygen; and
    a hydrogen collecting chamber operatively connected to the microfluidic reactor outlet and resting on a chamber stage within the enclosure at the lower elevation to receive and store the generated hydrogen from the reactor.

11. The microfluidic electrolyzer as claimed in claim 10, further comprising a solar PV panel disposed over the enclosure having electrical connectivity with the anode and the cathode of the microfluidic reactor, wherein the solar PV panel generates electricity which create the electric field inside the microfluidic reactor's microchannel though the anode and the cathode assembly.

12. The microfluidic electrolyzer as claimed in claim 10, wherein the enclosure and the stages for holding the reservoir, reactor and the chamber are prepared by cutting polymethyl methacrylate (PMMA) sheets into pieces and then joining them through adhesives.

13. A method for fabricating the microreactor specific to microfluidic electrolyzer as claimed in claim 1, further comprising template molding of chemically inert, biocompatible, optically transparent, and thermally stable polymer including poly-dimethyl siloxane (PDMS), said template molding based fabrication of the microfluidic reactor comprising (i) preparation of the template by involving stainless steel tailor needles and then (ii) casting of PDMS inside the template.

\* \* \* \* \*